United States Patent Office 3,047,265
Patented July 31, 1962

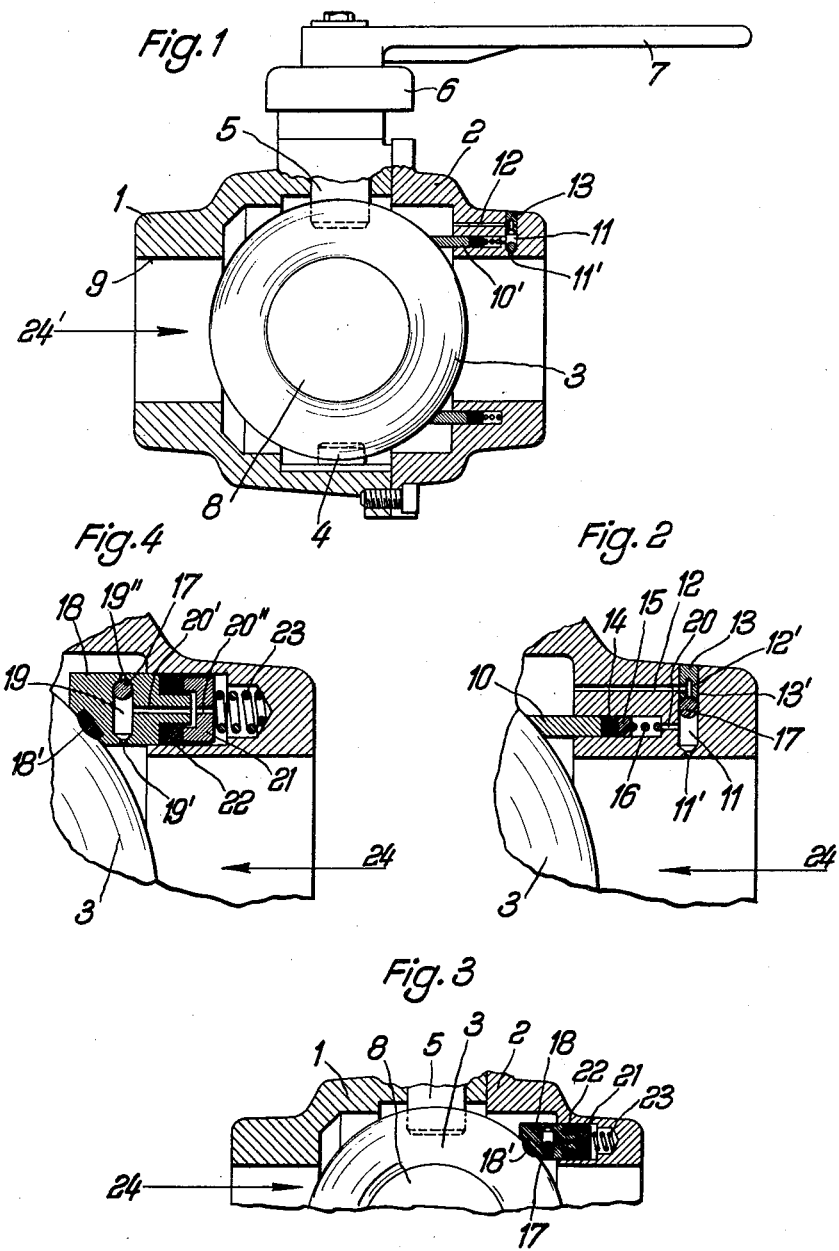

3,047,265
SPHERICAL-PLUG COCK HAVING A PISTON-TYPE PACKING RING DISPLACEABLY MOUNTED AT ONE SIDE OF THE COCK BODY
Rudolf Kaiser, Ruhrerweg 18, Ettlingen, Baden, Germany
Filed Dec. 2, 1958, Ser. No. 777,756
Claims priority, application Germany Aug. 11, 1958
6 Claims. (Cl. 251—172)

This invention relates to a spherical-plug cock, whose spherical plug is held in a freely suspended fashion in the body of the cock by means of two pivot pins situated diametrally opposite one another in the body of the cock, and is sealed with respect to the said body by means of a single piston-type packing ring which is made of non-deformable material and is arranged so as to be displaceable coaxially with respect to the throughflow passage in the cock body. This ring is pressed against the surface of the spherical plug by the pressure of the medium flowing through the cock. A spherical-plug cock constructed in this manner has the disadvantage that good fluid-tightness is ensured only in one direction of flow. If the medium flows in the opposite direction, the piston-type packing ring is no longer under tthe pressure of the said medium. The object of the invention is to obviate this disadvantage.

The solution of this problem according to the invention consists in that, either in a part of the cock body or in the piston-type packing ring, an automatic ball valve or cylinder valve, which as regards its control position is independent of the direction of pressure of the medium flowing through the spherical-plug cock, is so arranged between two ducts which are situated opposite one another and both of which are adapted to deliver the medium under pressure into the valve, that the piston-type packing ring at its rear side remote from the spherical plug is always under the pressure of the medium flowing through the cock. In this case, there is provided a bore or cylinder, whose axis is situated perpendicularly to the through aperture in the spherical plug and in which there is guided a valve member that is movable between the two end positions of valve closure; the bore has near each end a duct of which one is closed by the valve member in each end position. The bore is of such a length that in both positions of closure of the valve member the duct leading to the rear side of the piston-type packing ring and starting from the interior of the cylinder is held open. The valve member and the bore with its ducts complete a reversing valve.

Normally, the aforesaid piston-type ring is sealed by a rubber ring in its guide groove, which is formed by machining in the body of the cock. In order that the seal can no longer be effected detrimentally by shrinking, ageing or swelling of this rubber ring under the influence of the various media, the rear side of the piston-type packing ring remote from the spherical plug is to be subjected in a manner known per se not only to the pressure of the medium flowing through the spherical-plug cock, but also to the pressure of a coil spring supported in the cock body, said spring exerting pressure on the piston-type packing ring by way of a rigid pressure ring and an elastic sealing ring.

If the reversing valve is built into the piston-type packing ring, the cylinder containing the valve member is arranged in that part of the piston-type packing ring which projects out of the guide groove in the cock body, and the pressure ring which is subjected to spring pressure and has a U-shaped cross-section also comprises a bore allowing the throughflow of the pressure medium.

Two examples of embodiment are illustrated in FIGURES 1 to 4 of the accompanying drawings, in which:

FIGURE 1 is a sectional view of a spherical-plug cock constructed according to the invention, taken in the longitudinal axis of the said cock;

FIGURE 2 is a fragmentary view on a larger scale of a detail of FIGURE 1;

FIGURE 3 is part of a longitudinal sectional view of a spherical-plug cock wherein the reversing valve is built into the piston-type packing ring, and FIGURE 4 shows a detail of FIGURE 3, on a larger scale.

The cock body which is given the reference numeral 1 is closed by the body cover 2. The body comprises a through-flow passage 9. The spherical plug 3, which is provided with the through aperture 8, is suspended by means of the pivot pins 4 and 5. The bearing pin 5 is connected to the operating handle 7. Provided below this handle is a shield 6 which is intended to prevent the penetration of dust, rain or spray water into the upper part of the bore of the body 1. The spherical plug 3 suspended freely in the body 1, is sealed by the piston-type packing ring 10 which is guided in an annular groove in the body cover 2. Of course, the piston-type packing ring could also be guided in an annular groove in the body 1.

In the example of embodiment illustrated in FIGURES 1 and 2, the reversing valve is arranged in the housing cover. This valve consists of a ball valve member 17 which is mounted in a cylinder 11 whose longitudinal axis is perpendicular to the axis of the throughflow passage 9 of the cock body 1. The aforesaid cylinder 11 is connected to the passage 9 through the duct 11'. In this way it is under the pressure of the medium flowing through the cock, when the said medium is flowing in the direction of the arrow 24. This is clearly shown in FIGURE 2. If the direction of flow is reversed, namely, if the medium flows in the direction indicated by the arrow 24' in FIGURE 1, the flowing medium flows through the duct 12 and the duct 12' perpendicular into the valve cylinder 11 in this case also. For manufacturing reasons, this cylinder is closed towards the exterior of the cock body by the part 13 in which the duct 12' is situated.

When the direction of flow is that indicated by the arrow 24' in FIGURE 1, the ball valve member 17 is in its lower position and thus closes the valve cylinder 11 relatively to the duct 11'. When the flow direction is that illustrated in FIGURE 2, the ball valve member 17 is in the upper position and closes the duct 12'. In each of the two cases, however, the duct 20 which extends perpendicularly to the axis of the valve cylinder 11 is held free for the throughflow of the medium, and in this way the medium exerts a pressure on that face of the piston-type packing ring which is remote from the spherical plug 3, and thus presses this ring against the surface of the spherical plug 3.

Further pressure is exerted on the piston-type packing ring 10 by the coil spring 16. Interposed between the two is the pressure ring 15 and the sealing ring 14. Therefore, the seal is no longer dependent on the elasticity of the sealing ring 14, which is constructed preferably as a rubber ring, since the compressive forces which cause the piston-type ring 10 to bear against the spherical plug 3 proceed from the spring 16 through the pressure ring 15 to the rubber ring 14 and are transferred thence to the piston type ring 10.

In the example of embodiment according to FIGURES 3 and 4, the reversing valve is built into the piston-type packing ring. This piston-type ring is given the reference numeral 18. A rubber sealing segment 18' is vulcanized on to that face of the said piston-type ring which bears against the surface of the spherical plug 3. The ball valve member 17, which could also be replaced by a cylindrical valve member, is slidably mounted in the valve cylinder 19. When the medium flows in the direction 24' illustrated by the arrow in FIGURE 3, said ball valve member closes the lower duct 19' of the valve cylinder 19, and when the flow direction is that illustrated at 24 in FIGURE 4 it closes the duct 19" in the cylinder 19. Thus the medium passes either through the duct 19' or through the duct 19" into the valve cylinder 19 and, through the duct 20" extending at right angles to the axis of the last-mentioned cylinder, to the rear side of the piston-type packing ring 18.

In the example of embodiment according to FIGURES 3 and 4, the pressure ring 21 which presses the sealing ring 22 against the piston-type ring 18, has a U-shaped cross-section. In order that the medium flowing through the spherical-plug cock can also reach the rear side of the pressure ring, ducts 20" are provided in the pressure ring 21. Each of a plurality of springs 23 bears at one end against a recess in the body cover 2 and at the other end on the rear side of the pressure ring 21. This guarantees that the piston-type ring 18 is always under the pressure of the flowing medium and is also under spring pressure. In this case also, swelling or shrinking of the sealing ring 22 has no influence on the sealing of the piston-type ring 18 within its guide groove, which can be situated either in the body cover 2 or in the body 1.

I claim:

1. A spherical-plug cock comprising a cock body member with a throughflow passage therein, a piston-type packing ring member of non-deformable material mounted at one side of said body coaxially with said passage and being reciprocably movable and operable to be displaced in one direction into contact with the spherical plug under the pressure of the flowing medium, an automatic reversing valve associated with said cock, said valve having a bore and two oppositely disposed ducts defined in one of said members and connecting the opposite sides of the cock passage before and after the packing ring with the bore of the automatic valve, and a duct closing valve member movably disposed in the bore of said valve and operable to close either duct, said packing ring having a rear side, a passage defined in one of said members establishing a communication between said rear side and said bore, whereby the pressure of the flowing medium is always transmitted to the rear side of said packing ring remote from the spherical plug urging the packing ring in said one direction irrespective of the direction of flow of the medium through the cock.

2. A spherical-plug cock as claimed in claim 1, wherein the automatic valve is arranged in the cock body.

3. A spherical-plug cock as claimed in claim 1, wherein the automatic valve is arranged in the piston-type packing ring.

4. A spherical-plug cock as claimed in claim 1, the axis of said bore being perpendicular to the throughflow passage, said communication establishing passage leading from the interior of the bore to the rear side of the piston-type packing ring, the length of said bore being such that in either closed position of the valve member the said conduit is held open.

5. A spherical-plug cock as claimed in claim 1 and comprising means for supplementing the pressure of the flowing medium on the piston-type packing ring, said means including a coil spring supported in the cock body, and a rigid pressure ring and an elastic sealing ring which transmit the pressure of the coil spring and the pressure of the flowing medium to the rear side of the piston-type packing ring.

6. A spherical-plug cock as claimed in claim 5, wherein the piston-type packing ring projects from a guide groove in the cock body to engage the spherical cock and the reversing valve bore is formed in the projecting part of said packing ring, and the pressure ring which bears against the end of the piston-type packing ring remote from the spherical cock under the pressure of the coil spring and of the flowing medium has a U-shaped cross section and is formed with a throughflow duct for the pressure medium.

References Cited in the file of this patent

UNITED STATES PATENTS

| | | |
|---|---|---|
| 1,080,027 | Van Sinderen | Dec. 2, 1913 |
| 1,327,984 | Campbell | Jan. 13, 1920 |
| 2,354,791 | Boldt | Aug. 1, 1944 |
| 2,558,087 | Holl | June 26, 1951 |
| 2,558,260 | Maky | June 26, 1951 |
| 2,603,449 | Overholser | July 15, 1952 |
| 2,628,060 | Parker | Feb. 10, 1953 |
| 2,664,267 | Ray | Dec. 29, 1953 |
| 2,732,170 | Shand | Jan. 25, 1956 |
| 2,800,295 | Thomas | July 23, 1957 |
| 2,819,868 | Cauffman | Jan. 14, 1958 |
| 2,825,527 | Wendell | Mar. 4, 1958 |
| 2,839,074 | Kaiser | June 17, 1958 |
| 2,916,254 | Wendell | Dec. 8, 1959 |

FOREIGN PATENTS

| | | |
|---|---|---|
| 4,947 | Great Britain | Mar. 7, 1893 |
| 131,734 | Switzerland | May 16, 1929 |